(12) United States Patent
Kido

(10) Patent No.: US 10,820,974 B2
(45) Date of Patent: Nov. 3, 2020

(54) INTERDENTAL BRUSH

(71) Applicant: NICE RENEW CO., LTD., Kaohsiung (TW)

(72) Inventor: Hiroshi Kido, Kanagaw (JP)

(73) Assignee: NICE RENEW CO., LTD., Kaohsiung (TW)

(*) Notice: Subject to any disclaimer, the term of this patent is extended or adjusted under 35 U.S.C. 154(b) by 259 days.

(21) Appl. No.: 15/982,121

(22) Filed: May 17, 2018

(65) Prior Publication Data
US 2019/0110872 A1 Apr. 18, 2019

(30) Foreign Application Priority Data
Oct. 13, 2017 (TW) .............................. 106135187 A

(51) Int. Cl.
| | | |
|---|---|---|
| A61C 15/00 | (2006.01) | |
| A46B 9/04 | (2006.01) | |
| A61C 15/02 | (2006.01) | |
| A46B 3/00 | (2006.01) | |
| A46B 5/02 | (2006.01) | |
| A46B 9/00 | (2006.01) | |
| B29L 31/42 | (2006.01) | |

(52) U.S. Cl.
CPC .............. *A61C 15/00* (2013.01); *A46B 3/005* (2013.01); *A46B 5/02* (2013.01); *A46B 9/005* (2013.01); *A46B 9/04* (2013.01); *A61C 15/02* (2013.01); *A46B 2200/108* (2013.01); *B29L 2031/425* (2013.01)

(58) Field of Classification Search
CPC ........... A61C 15/00; A61C 15/02; A61C 7/28; A46B 3/005; A46B 5/02; A46B 9/005; A46B 9/04
USPC .......................................................... 433/15
See application file for complete search history.

(56) References Cited

U.S. PATENT DOCUMENTS

| | | | | |
|---|---|---|---|---|
| 4,347,217 A | * | 8/1982 | Radkins ..................... | A61L 9/03 422/126 |
| 4,535,761 A | * | 8/1985 | Rabinowitz ............ | A61H 13/00 601/141 |
| 4,683,875 A | * | 8/1987 | Rabinowitz ............ | A61H 13/00 601/141 |
| 5,775,346 A | * | 7/1998 | Szyszkowski ......... | A61C 15/00 132/321 |

(Continued)

*Primary Examiner* — Nicholas D Lucchesi
(74) *Attorney, Agent, or Firm* — Karin L. Williams; Mayer & Williams PC

(57) ABSTRACT

An interdental brush includes a handle, a shank extending therefrom, and a bristle portion disposed around the shank. The bristle portion has a plurality of bristle units, each of which has a loading surface facing the handle and having a diameter larger than a diameter of the shank, and a surrounding wall extending from the loading surface toward a direction opposite to the handle with the extent progressively decreasing therefrom. The loading surface and the surrounding wall converge at a brim. The gradually-reduced arrangement of each surrounding wall facilitates an easy entrance into slits between teeth and provides each loading surface and brim with sufficient support to scrape and remove food debris and tartar while pulling the brush out. The revolution of bristle units around the shank helps the brush touch and massage gingivae in a large area, thereby increasing the effect of cleaning teeth and convenience of use.

4 Claims, 8 Drawing Sheets

(56) References Cited

U.S. PATENT DOCUMENTS

| | | | | |
|---|---|---|---|---|
| 2001/0002309 A1* | 5/2001 | Birkel | ............... | A61C 7/28 |
| | | | | 433/15 |
| 2005/0037316 A1* | 2/2005 | Sholder | ............ | A61C 3/03 |
| | | | | 433/119 |
| 2008/0149134 A1* | 6/2008 | Crossman | ........... | A61C 15/02 |
| | | | | 132/324 |
| 2015/0282601 A1* | 10/2015 | Butz | ................. | A61B 1/00 |
| | | | | 15/167.1 |
| 2016/0058531 A1* | 3/2016 | Adriano | ............ | A46B 3/005 |
| | | | | 132/329 |
| 2017/0099940 A1* | 4/2017 | Gottlieb | ............. | A46B 9/026 |
| 2017/0164724 A1* | 6/2017 | Moskovich | .......... | A46B 5/02 |
| 2017/0215568 A1* | 8/2017 | Kim | ................. | A46B 9/04 |
| 2018/0193119 A1* | 7/2018 | Butz | ................. | A61C 15/02 |
| 2018/0279755 A1* | 10/2018 | Zhang | ............... | A46B 5/021 |
| 2020/0093467 A1* | 3/2020 | Lonky | ............. | A61B 10/0291 |

* cited by examiner

INTERDENTAL BRUSH

BACKGROUND OF THE INVENTION

1. Field of the Invention

This invention relates to an interdental brush and relates particularly to an interdental brush capable of massaging gingivae and removing food debris and tartar remaining in slits between teeth. The interdental brush can be made from soft materials to benefit the convenience of use.

2. Description of the Related Art

Generally, commodities for use in cleaning an oral cavity and maintaining dental health are mainly toothbrushes, toothpicks or dental floss. Toothbrushes are provided with changeless shape. Therefore, a toothbrush cannot match dental patterns completely and cannot penetrate into slits between teeth deeply. Thus, a toothbrush is unable to clean food debris remaining in the slits fully. Therefore, toothpicks or dental floss are usually applied to assist in enhancing the cleaning effect. Although toothpicks can remove food debris, the toothpicks may cause gingivae bleeding or damage the surfaces of the teeth because toothpicks are usually made from hard materials. On the other hand, although dental floss can be deeply inserted into slits, dental floss is not strong enough to remove all food debris. Therefore, dental floss can only scrape parts of food debris, which results in an incomplete cleaning. Thus, interdental brushes have been invented in order to clean teeth thoroughly and maintain oral hygiene.

Referring to FIG. 1, a conventional interdental brush 1 includes a handle 11, a shank 12 extending downwards from the handle 11, and a plurality of bristles 13 radially extending outwards from the shank 12. Although the interdental brush 1 can be inserted into slits to clean teeth and massage gingivae, the massage process of the gingivae is executed poorly because the bristles 13 touch the gingivae and the surfaces of the slits in an insufficient area. Hence, the effect of massaging the gingivae is poor. Moreover, the bristles 13 are not strong enough to remove food debris and tartar from the slits, which results in a bad cleaning effect. Thus, the conventional interdental brush 1 still needs to be improved.

SUMMARY OF THE INVENTION

The object of this invention is to provide an interdental brush capable of massaging gingivae and removing food debris and tartar remaining in slits between teeth to effectively increase the cleaning effect and the convenience of use.

The interdental brush of this invention comprises a handle, a shank extending downwards therefrom, and a bristle portion fitted on the shank. The bristle portion has a plurality of bristle units fitted around the shank. Each bristle unit has a loading surface extending outwards from the shank and facing the handle, a surrounding wall extending axially from the loading surface toward a direction opposite to the handle and decreasing progressively from the loading surface, and a brim formed at a convergence of the loading surface and the surrounding wall. A diameter of the loading surface is larger than a diameter of the shank. Hence, the surrounding walls each are formed in a progressively reducing arrangement so that each bristle unit is formed into an inverted frustumconical shape. This structure facilitates an easy entrance of the shank and the bristle portion into the slits between teeth. When pulling the interdental brush toward the outside, the surrounding walls prop the loading surfaces and the brims to provide great support, thereby scraping and removing food debris and tartar away from the slits effectively and enhancing the effect of cleaning the slits greatly. Moreover, the revolution of the bristle units around the shank assists the interdental brush in touching the gingivae and the slits with a large area, thereby cleaning food debris and tartar effectively, attaining the effect of massaging the gingivae during the cleaning process, and increasing the convenience of use.

Preferably, the bristle units are spaced apart from each other on the shank.

Preferably, the bristle units are successively connected one after another by extending the surrounding wall of one bristle unit from the loading surface of the one bristle unit to the loading surface of another adjacent bristle unit.

Preferably, at least two of the bristle units are successively connected as a bristle set. A plurality of bristle sets are spaced apart from each other on the shank.

Preferably, the surrounding walls each have an extending length extending between the loading surfaces of the adjacent bristle units. Every two extending lengths of the surrounding walls of the adjacent bristle units are different.

Preferably, an accommodation space is recessedly formed on the loading surface of each bristle unit.

DETAILED DESCRIPTION OF THE PREFERRED EMBODIMENTS

Figure 1:
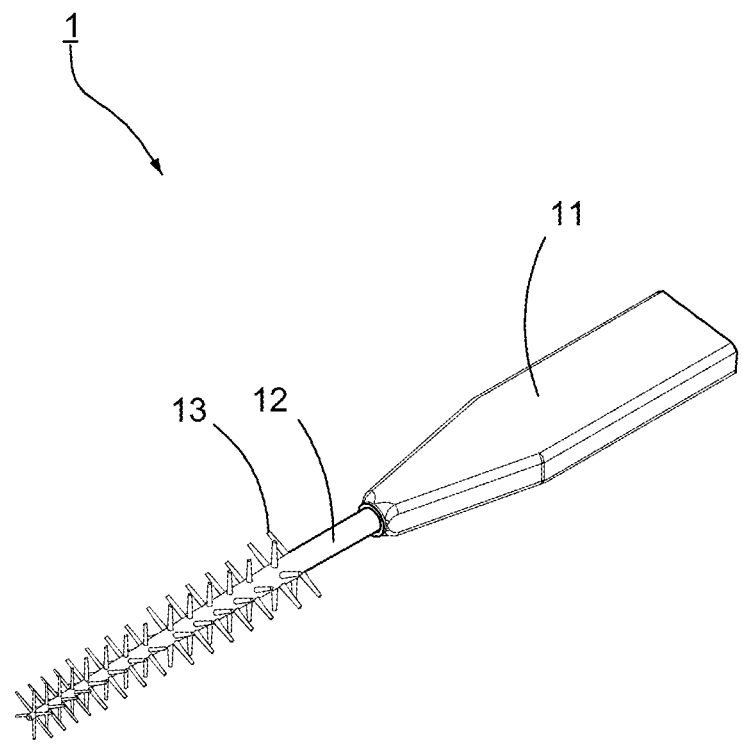
FIG. 1 is a schematic view showing a conventional interdental brush.
Figures 2, 2A:
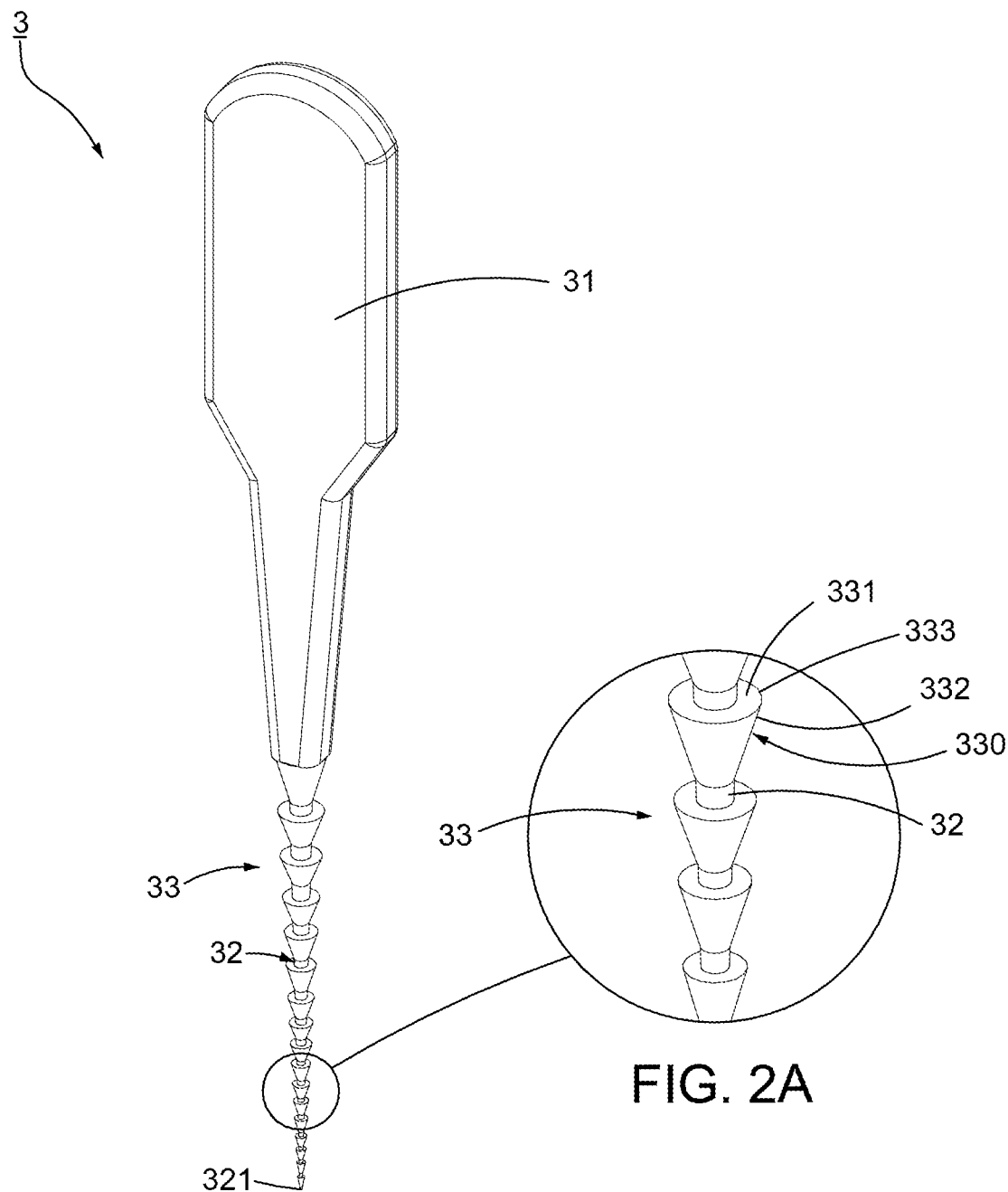
FIG. 2 is a perspective view showing a first preferred embodiment of this invention.
FIG. 2A is an enlarged view showing a partial element of FIG. 2.
Figure 3:
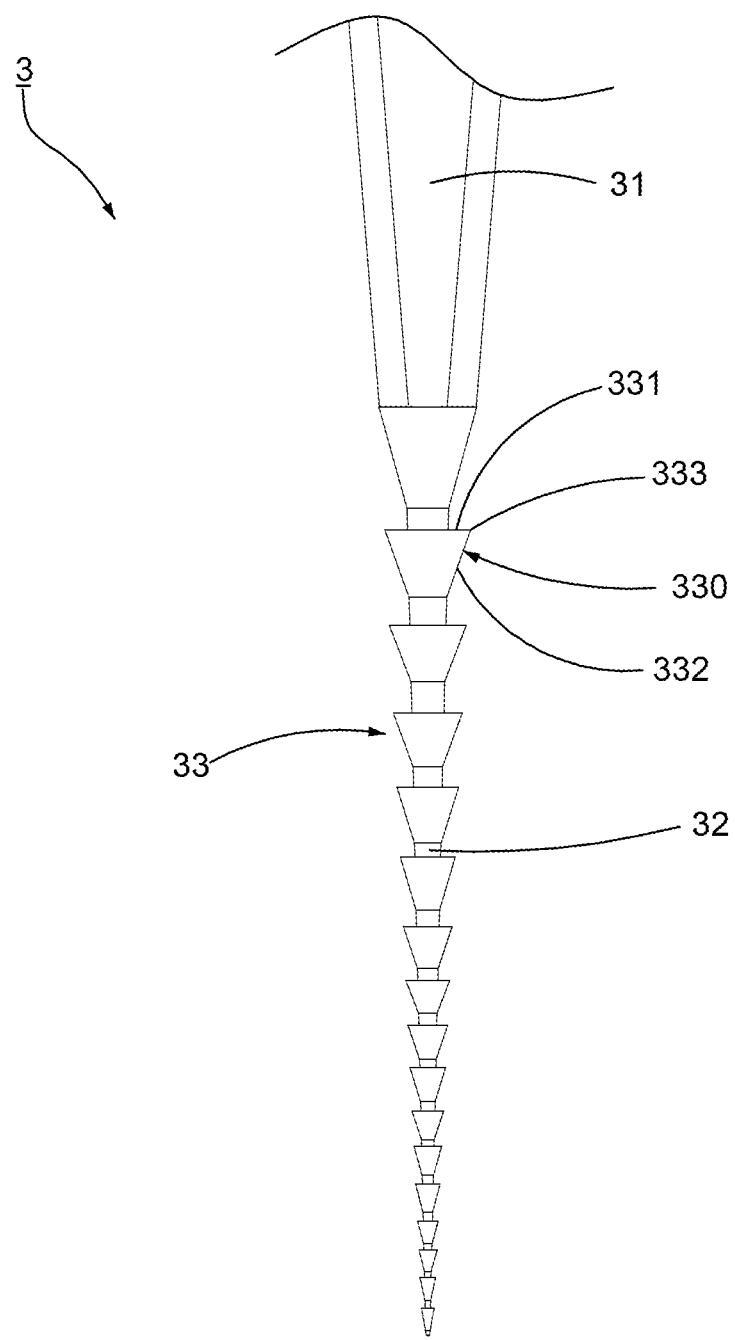
FIG. 3 is a schematic view showing the first preferred embodiment of this invention.
Figure 4:
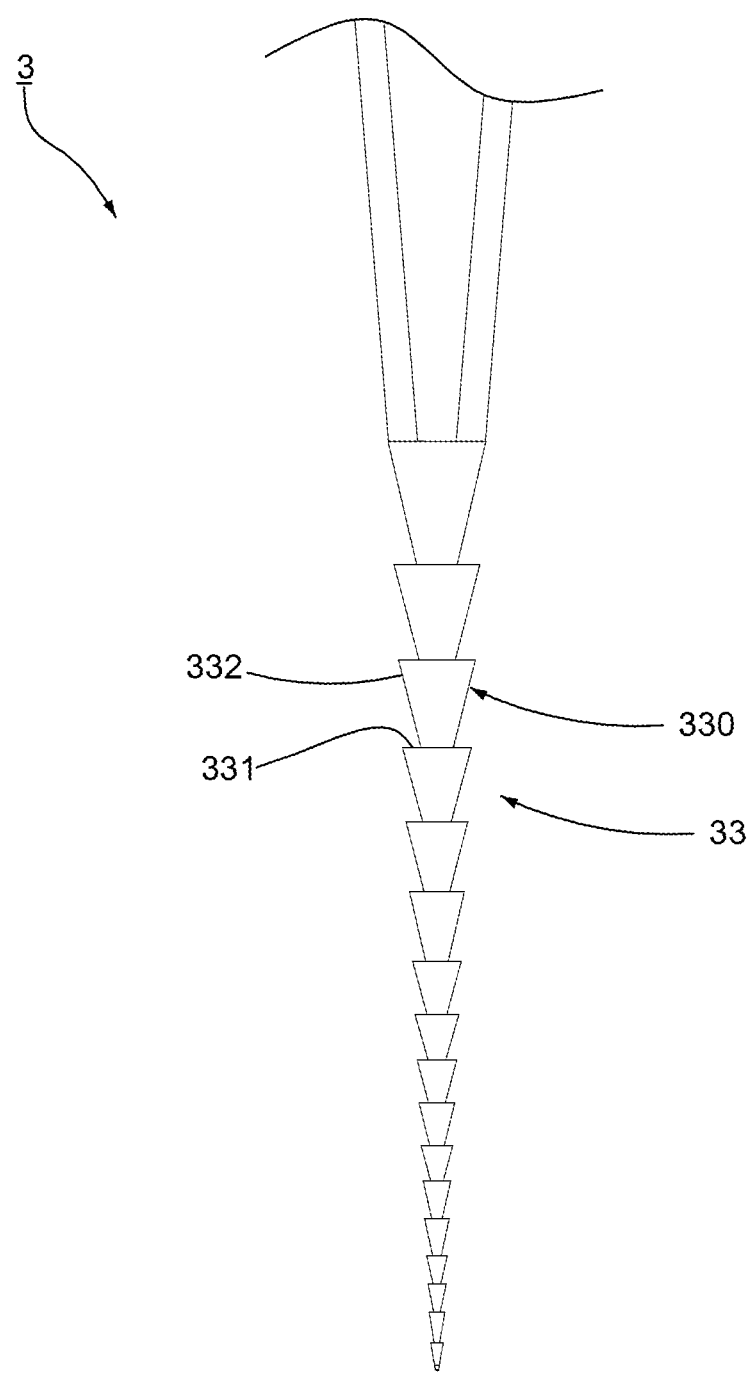
FIG. 4 is a schematic view showing a second preferred embodiment of this invention.

Referring to FIG. 2 and FIG. 2A, a first preferred embodiment of an interdental brush 3 of this invention is disclosed. The interdental brush 3 includes a handle 31, a shank 32 extending downwards from the handle 31 and tapering off to an end 321, and a bristle portion 33 disposed around the shank 32 and gradually decreased in a direction opposite to the handle 31 to become tapered. The bristle portion 33 has a plurality of bristle units 330 disposed around the shank 32. In other words, the bristle units 330 connect and surround around an outer periphery of the shank 32. Each bristle unit 330 is disposed a revolution around the shank 32 and has a loading surface 331, and a surrounding wall 332 connecting to the loading surface 331 and slantingly extending outwards from a periphery of the loading surface 331. Specifically, each loading surface 331 extends outwards from the shank 32 and faces the handle 31. As shown in FIG. 2A, the loading surface 331 is disposed in a circumferential direction around the shank 32 to perform the extension of the loading surface 331, and the loading surface 331 can be horizontally formed around the shank 32; for instance, the loading surface 331 can be perpendicular to the shank 32 as shown. A diameter of the loading surface 331 is larger than a diameter of the shank 32. Each surrounding wall 332 extends axially downwards from the loading surface 331 toward a direction opposite to the handle 31 and reduces gradually from the loading surface 331. In other words, each surrounding wall 332 decreases progressively toward a direction of the end 321 of the shank 32. The loading surface 331 and the surrounding wall 332 of each bristle unit 330 converge at a brim 333 which is formed at the outermost periphery of the loading surface 331. The surrounding wall 332 each are formed in a gradually decreasing arrangement so as to form each bristle unit 330 into an inverted frustumconical shape disposed around the shank 32, thereby inserting into slits between teeth deeply, removing foreign matters, and massaging gingivae. Moreover, the bristle units 330 can be arranged to separate from each other so as to expose the shank 32 between any two of the adjacent bristle units 330, as shown in FIG. 3. On the other hand, the bristle units 330 can be arranged to connect one after another successively, in other words, a surrounding wall 332 of one bristle unit 330 extends downwards from the loading surface 331 of one bristle unit 330 to contact a loading surface 331 of the following bristle unit 330 to form a successive arrangement of the bristle units 330 on the shank 32, shown as the second preferred embodiment of this invention in FIG. 4. Here takes an example that the bristle units 330 are spaced apart from each other. The bristle units 330 are made from soft materials or flexible materials to prevent the teeth and the gingivae from being injured.

Figure 5:
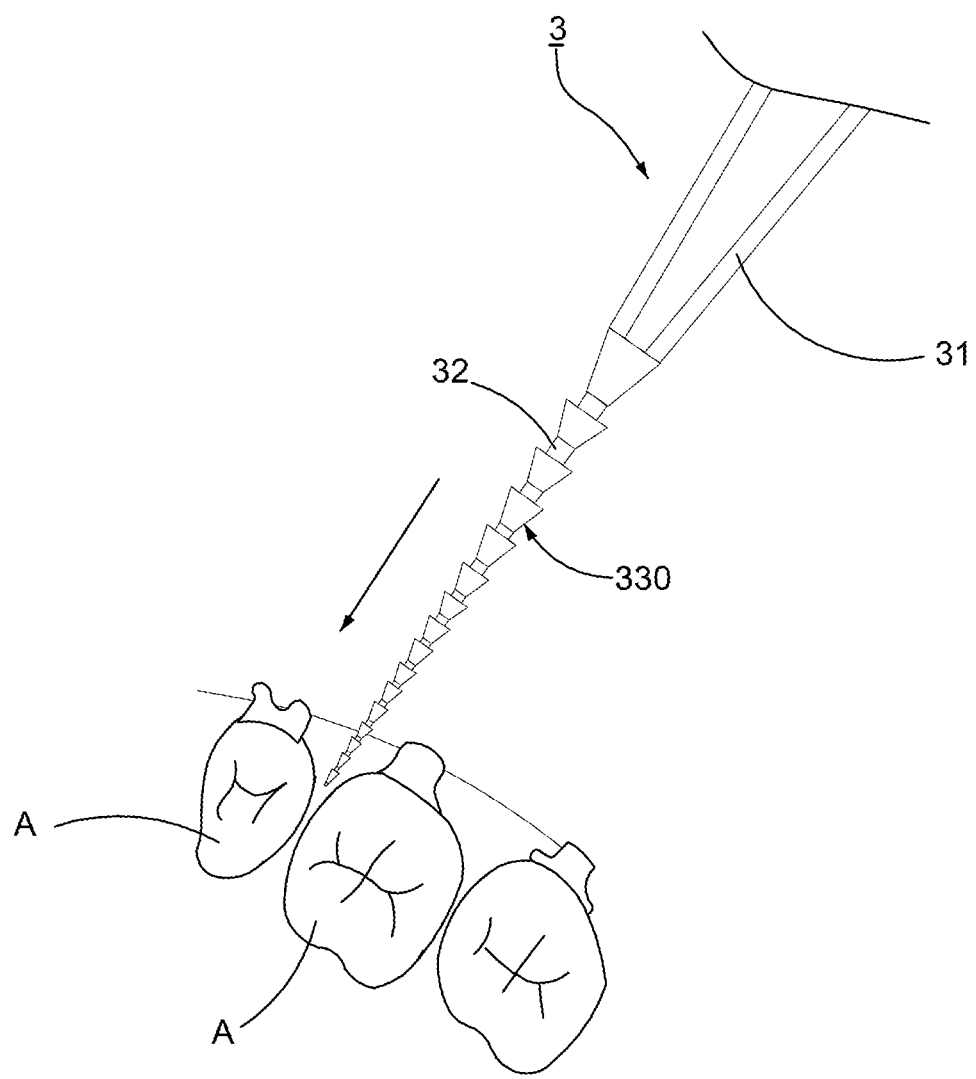
FIG. 5 is a schematic view showing the simulation when the first preferred embodiment of this invention inserts into slits between teeth.

Referring to FIG. 2 and FIG. 5, during the cleaning operation, the user holds the handle 31 and inserts the shank 32 into a slit between any two teeth A. Because the progressively-decreased surrounding walls 332 allow each bristle unit 330 to be formed into the inverted frustumconical shape, the structure of the bristle units 330 can penetrate through the slit quickly and easily. In addition, the revolution of the bristle units 330 around the shank 32 enlarges the area of touching the gingivae. Therefore, the bristle units 330 are provided with enough area to touch the gingivae, thereby attaining the effect of massaging the gingivae. When the user pulls the bristle portion 33 outwards from the slit, the surrounding wall 332 provides the brim 333 and the loading surface 331 with enough support for executing the cleaning operation. In other words, the brim 333 can scrape the tartar formed on the surfaces of the teeth A and the food debris remaining in the slits effectively. The scraped tartar and food debris accumulate on the loading surface 331 and are pushed by the loading surface 331 to be removed away from the slit when the bristle portion 33 is pulled outwards. Hence, the effect of cleaning the teeth A is enhanced and the convenience of use is increased effectively.

Figure 6:
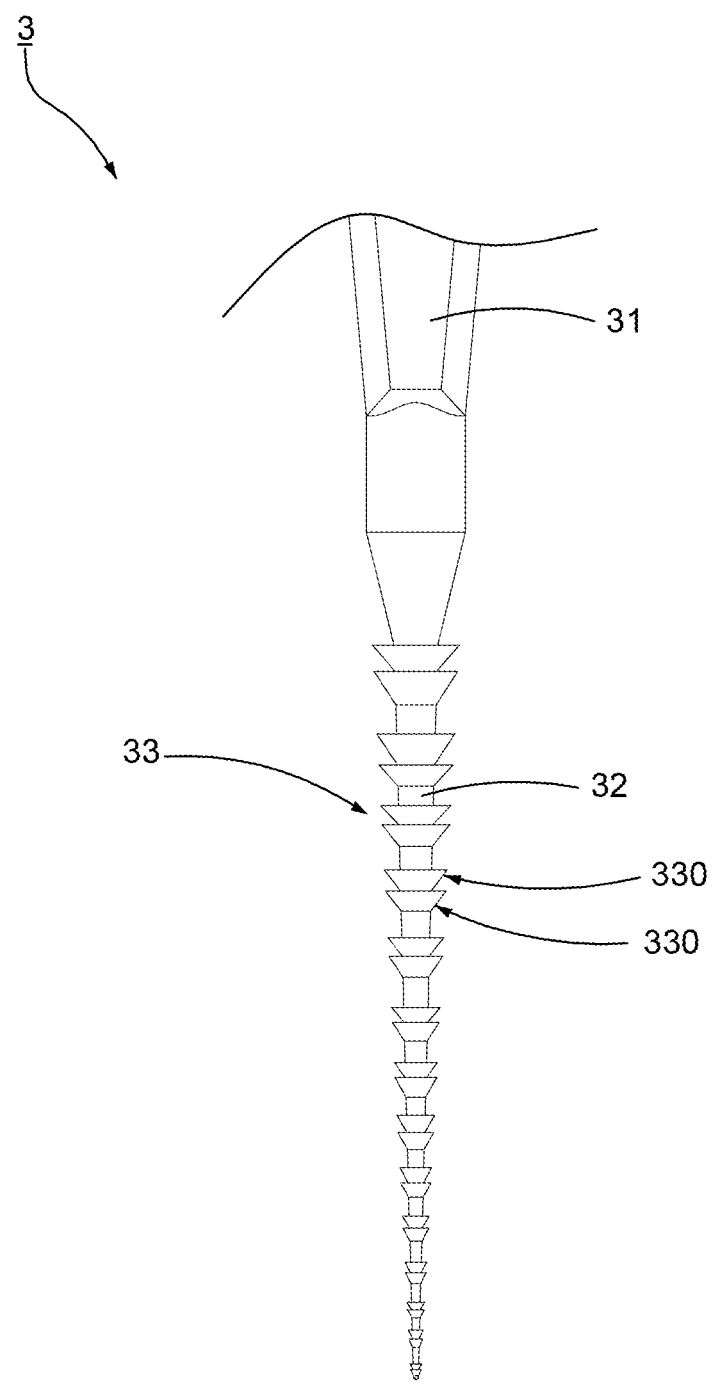
FIG. 6 is a schematic view showing a third preferred embodiment of this invention.

FIG. 6 shows a third preferred embodiment of the interdental brush 3 of this invention which still includes the handle 31, the shank 32 extending downwards from the handle 31, and the bristle portion 33 fitted on the shank 32. The correlated elements and the concatenation of elements, the operation and objectives of the third preferred embodiment are the same as those of the first preferred embodiment. This embodiment is characterized in that at least two of the bristle units 330 are successively connected as a bristle set. A plurality of bristle sets are spaced apart from each other on the shank 32. In this preferred embodiment, two bristle units 330 connect together to form the bristle set, as shown in FIG. 6.

Figure 7:
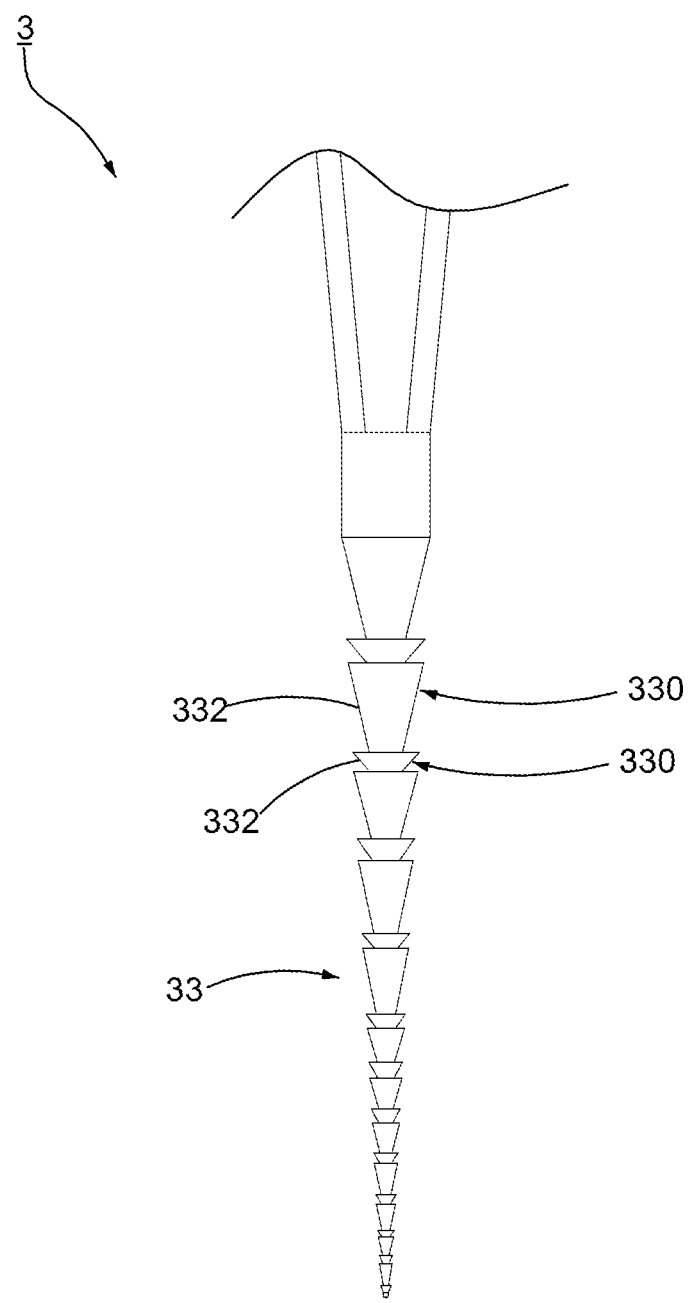
FIG. 7 is a schematic view showing a fourth preferred embodiment of this invention.

FIG. 7 shows a fourth preferred embodiment of the interdental brush 3 of this invention which still includes the handle 31, the shank 32 extending downwards from the handle 31, and the bristle portion 33 fitted on the shank 32. The correlated elements and the concatenation of elements, the operation and objectives of the third preferred embodiment are the same as those of the second preferred embodiment. The bristle units 330 are still successively connected one after another. This embodiment is characterized in that the surrounding walls 332 each have an extending length extending between the loading surfaces 331 of the adjacent bristle units 330. Every two extending lengths of the surrounding walls 332 of the adjacent bristle units 330 are different to form an irregular arrangement of the bristle units 330 on the shank 32.

Referring to FIG. 7 shows a fourth preferred embodiment of the interdental brush 3 of this invention which still includes the handle 31, the shank 32 extending downwards from the handle 31, and the bristle portion 33 fitted on the shank 32. The correlated elements and the concatenation of elements, the operation and objectives of the third preferred embodiment are the same as those of the second preferred embodiment. The bristle units 330 are still successively connected one after another. This embodiment is characterized in that the surrounding walls 332 each have an extending length extending between the loading surfaces 331 of the adjacent bristle units 330. Every two extending lengths of the surrounding walls 332 of the adjacent bristle units 330 are different to form an irregular arrangement of the bristle units 330 on the shank 32.

Regardless of the arrangement of the bristle units 330 which is the spaced-apart, successively-connected, or irregular arrangement with different extending lengths of the surrounding walls 332 of the adjacent bristle units 330, the interdental brush 3 can clean the teeth A, massage the gingivae effectively, achieve the clean and hygienic condition of the teeth A and attain the best state of the teeth A.

Figures 8, 8A:
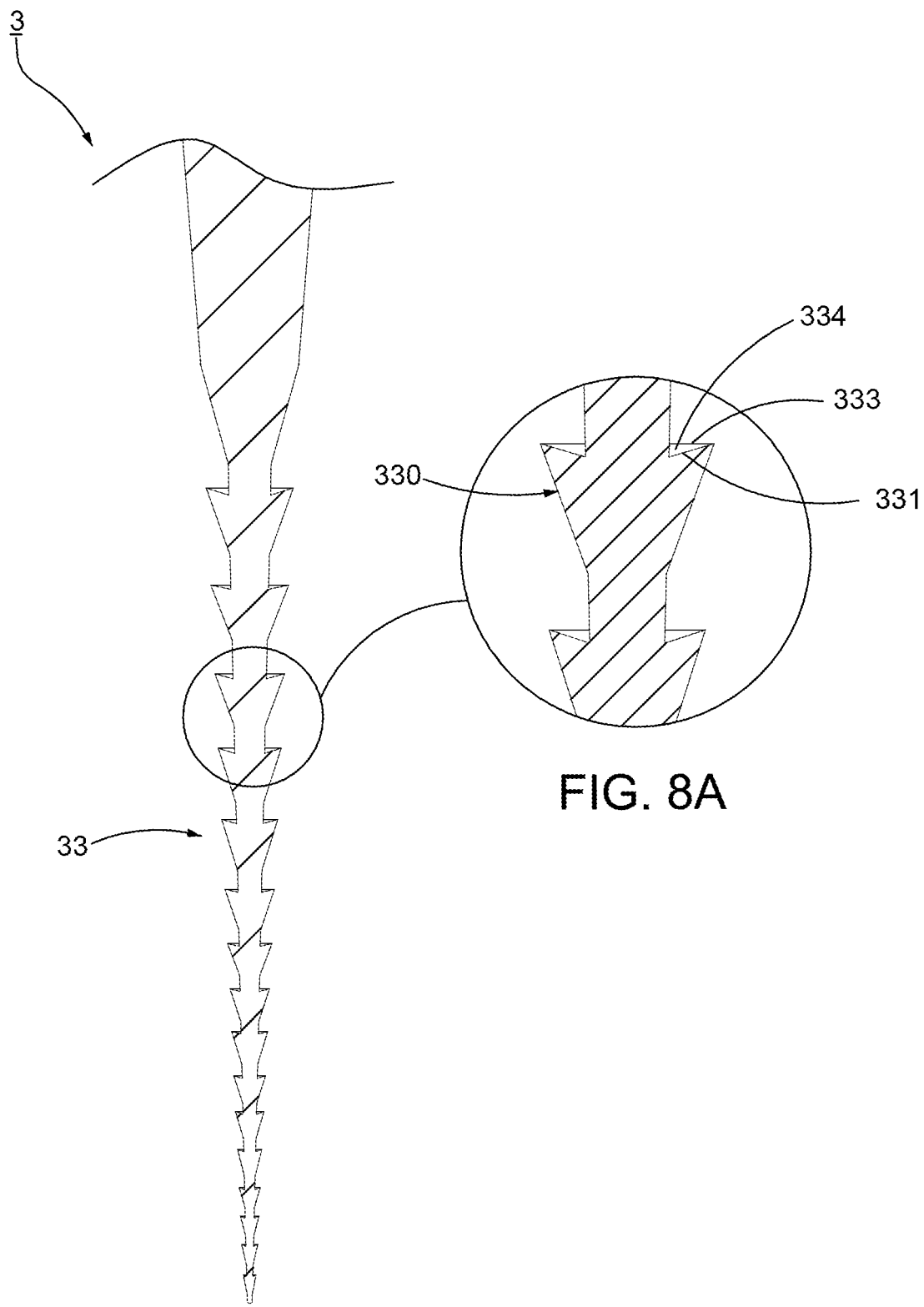
FIG. 8 is a cross-sectional view showing a fifth preferred embodiment of this invention.
FIG. 8A is an enlarged view showing a partial element of FIG. 8.

FIG. 8 shows a fifth preferred embodiment of the interdental brush 3 of this invention which still includes the handle 31, the shank 32, and the bristle portion 33. This embodiment is characterized in that the loading surface 331 of each bristle unit 330 is provided with an accommodation space 334. In other words, the accommodation space 334 is a recessed space recessedly formed within the brim 333, namely formed between the brim 333 and the shank 32, when the loading surface 331 is angularly disposed relative to the shank 32 as shown in FIG. 8A. For example, the loading surface 331 can be, but not limited to, slantingly formed or curvedly formed. Hence, after the bristle units 330 insert into the slits, the accommodation spaces 334 allow the food debris and tartar to accommodate therein, thereby removing the food debris and tartar away from the slits easily when pulling the bristle portion 33 outwards and increasing the effect of cleaning the slits.

To sum up, the interdental brush of this invention takes advantages that each bristle unit disposed around the shank has a loading surface whose diameter is larger than the diameter of the shank, a surrounding wall extending from the loading surface toward the end of the shank and reducing gradually from the loading surface, and a brim formed at the convergence of the loading surface and the surrounding wall to form the bristle unit into the inverted frustumconical shape to facilitate the easy entrance into the slits. When pulling the interdental brush outwards, the surrounding walls can support the loading surfaces and the brims sufficiently to scrape and remove the food debris and the tartar remaining in the slits. Further, the revolution of the bristle units around the shank assists the interdental brush in touching the gingivae with enlarged area, thereby achieving the effect of massaging the gingivae, increasing the effect of cleaning the teeth effectively, and enhancing the convenience of use.

While the embodiments of this invention are shown and described, it is understood that further variations and modifications may be made without departing from the scope of this invention.

What is claimed is:

1. An interdental brush comprising:
a handle,
a shank extending outwards from said handle and forming an end, and
a bristle portion disposed on said shank;
wherein said bristle portion includes a plurality of bristle units disposed around said shank, each of said plurality of bristle units having a loading surface extending outwards from said shank and facing said handle, a surrounding wall extending axially from said loading surface toward a direction opposite to said handle and decreasing progressively in the direction of said end, and a brim formed at a convergence of said loading surface and said surrounding wall, a diameter of said loading surface being larger than a diameter of said shank,
wherein said plurality of bristle units are spaced apart from each other on said shank.

2. An interdental brush comprising:
a handle,
a shank extending outwards from said handle and forming an end, and
a bristle portion disposed on said shank;
wherein said bristle portion includes a plurality of bristle units disposed around said shank, each of said plurality of bristle units having a loading surface extending outwards from said shank and facing said handle, a surrounding wall extending axially from said loading surface and decreasing progressively in the direction of said end, and a brim formed at a convergence of said loading surface and said surrounding wall, a diameter of said loading surface being larger than a diameter of said shank,
wherein at least two successive bristle units are connected as a bristle set to divide the bristle portion into a plurality of bristle sets, with the plurality of bristle sets spaced apart from each other on said shank said at least two successive bristle units of the same bristle set being connected one after another by extending said surrounding wall of one bristle unit from said loading surface of said one bristle unit to said loading surface of another adjacent bristle unit.

3. The interdental brush as claimed in claim 2, wherein said surrounding walls each have an extending length extending between said loading surfaces of said adjacent bristle units, every two extending lengths of said surrounding walls of said adjacent bristle units being different.

4. An interdental brush comprising:
a handle,
a shank extending outwards from said handle and forming an end, and
a bristle portion disposed on said shank;
wherein said bristle portion includes a plurality of bristle units disposed around said shank, each of said plurality of bristle units having a loading surface extending outwards from said shank and facing said handle, a surrounding wall extending axially from said loading surface toward a direction opposite to said handle and decreasing progressively in the direction of said end, and a brim formed at a convergence of said loading surface and said surrounding wall, a diameter of said loading surface being larger than a diameter of said shank,
wherein an accommodation space is recessedly formed on said loading surface of each of said plurality of bristle units.

\* \* \* \* \*